(12) United States Patent
Bono et al.

(10) Patent No.: US 9,288,210 B2
(45) Date of Patent: Mar. 15, 2016

(54) REVOCABLE OBJECT ACCESS

(75) Inventors: Joseph Andrew Bono, Kirkland, WA (US); Jeffrey E. Steinbok, Redmond, WA (US); Brian M. Perrin, Redmond, WA (US); Rebecca L. Pezely, Seattle, WA (US); Eileen S. Hash, Kirkland, WA (US); Gyorgy K. Schadt, Redmond, WA (US); David A. Citron, Redmond, WA (US); Jonathan A. Bockelman, Kirkland, WA (US); Daniel W. Crevier, Bellevue, WA (US); Michael F. Matsel, Seattle, WA (US); Amy J. Beauford, Carnation, WA (US); Shabbir A. Shahpurwala, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1584 days.

(21) Appl. No.: 12/359,963

(22) Filed: Jan. 26, 2009

(65) Prior Publication Data

US 2010/0192211 A1 Jul. 29, 2010

(51) Int. Cl.
| | | |
|---|---|---|
| *G06F 7/04* | (2006.01) | |
| *G06F 15/16* | (2006.01) | |
| *G06F 17/30* | (2006.01) | |
| *H04L 29/06* | (2006.01) | |
| *G06F 21/62* | (2013.01) | |

(52) U.S. Cl.
CPC .......... *H04L 63/101* (2013.01); *G06F 21/6209* (2013.01); *G06F 2221/2141* (2013.01)

(58) Field of Classification Search
CPC .............................. H04L 9/00; G06F 21/6209
USPC ................................. 726/4–5, 8, 30; 713/185
See application file for complete search history.

(56) References Cited

U.S. PATENT DOCUMENTS

| | | | |
|---|---|---|---|
| 6,339,423 B1 * | 1/2002 | Sampson et al. | ............... 715/854 |
| 6,728,716 B1 | 4/2004 | Bhattacharya et al. | |
| 7,035,854 B2 | 4/2006 | Hsiao et al. | |
| 7,290,266 B2 | 10/2007 | Gladstone et al. | |

(Continued)

FOREIGN PATENT DOCUMENTS

| | | | | |
|---|---|---|---|---|
| EP | 0913789 | * | 10/1998 | .............. G06F 17/60 |

OTHER PUBLICATIONS

Sauvain, et al. "Analysis of Extant Compound/Structured Document Systems", Retrieved at<<http://dmatech.info/csdocs/sketch/CSDocsExisting00.doc>>, Jul. 28, 1999, Revision 0.00, pp. 14.

(Continued)

*Primary Examiner* — Monjour Rahim
(74) *Attorney, Agent, or Firm* — Bryan Webster; Kate Drakos; Micky Minhas

(57) ABSTRACT

Techniques are described to provide revocable object access. In an implementation, a user may provide content and an object (e.g., a picture) to be published with the content. The object is uploaded to a storage location, and a uniform resource locator (URL) that includes a token is generated for the object. The token is registered in an access control list (ACL), and token permission settings in the ACL are utilized to control access to the object. The URL may be embedded in the content. When a viewer requests the content, the object may be retrieved from the storage location using the URL. The user may revoke access to the object by changing the token permission settings in the ACL.

20 Claims, 5 Drawing Sheets

(56) References Cited

U.S. PATENT DOCUMENTS

| | | | |
|---|---|---|---|
| 7,644,044 B2 * | 1/2010 | Candelore | 705/57 |
| 8,601,539 B1 * | 12/2013 | Bobel | 726/2 |
| 2002/0083438 A1 | 6/2002 | So et al. | |
| 2003/0200202 A1 * | 10/2003 | Hsiao et al. | 707/3 |
| 2005/0080807 A1 | 4/2005 | Beilinson et al. | |
| 2005/0138137 A1 | 6/2005 | Encarnacion et al. | |
| 2005/0246193 A1 | 11/2005 | Roever et al. | |
| 2006/0080546 A1 * | 4/2006 | Brannon et al. | 713/185 |
| 2006/0174347 A1 | 8/2006 | Davydov et al. | |
| 2007/0143457 A1 | 6/2007 | Mao et al. | |
| 2009/0070306 A1 * | 3/2009 | Stroe et al. | 707/4 |
| 2009/0265353 A1 * | 10/2009 | Vaddagiri | 707/9 |

OTHER PUBLICATIONS

"The Secure Access using Smart Cards Planning Guide", Retrieved at <<http://www.microsoft.com/technet/security/guidance/networksecurity/securesmartcards/scpgch04.mspx>>, Jun. 30, 2005, pp. 10.

* cited by examiner

REVOCABLE OBJECT ACCESS

BACKGROUND

Today's online environment provides users with a variety of ways to share content. For example, a user may maintain a web log ("blog") that allows a user to post text content and objects with the text content, such as pictures, video, audio, and so on. The text content and an associated object may be published for consumption by the general public, or published for limited access by one or more authorized viewers. Maintaining the security of and control over an object associated with content may be challenging, however. For example, it is typically difficult to control access to an object and to prevent unauthorized access to the object once the object has been published.

Previous techniques for securing and managing access to objects have a number of deficiencies. For example, the techniques are typically enforced at a front-end display layer, and thus make the techniques susceptible to being hacked or compromised if a particular device is compromised. Also, it is typically very difficult to manage or revoke permissions that control access to an object once the object has been published. Thus, if a user inadvertently publishes an object (e.g., a picture) that the user did not intend to publish, it is difficult to "un-publish" the object and prevent further access by users attempting to view the object.

SUMMARY

Techniques are described to provide revocable object access. In an implementation, a user may provide content and an object (e.g., a picture) to be published with the content. The object is uploaded to a storage location, and a uniform resource locator (URL) that includes a token is generated for the object. The token is registered in an access control list (ACL), and token permission settings in the ACL are utilized to control access to the object. The URL may be embedded in the content. When a viewer requests the content, the object may be retrieved from the storage location using the URL. The user may revoke access to the object by changing the token permission settings in the ACL.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
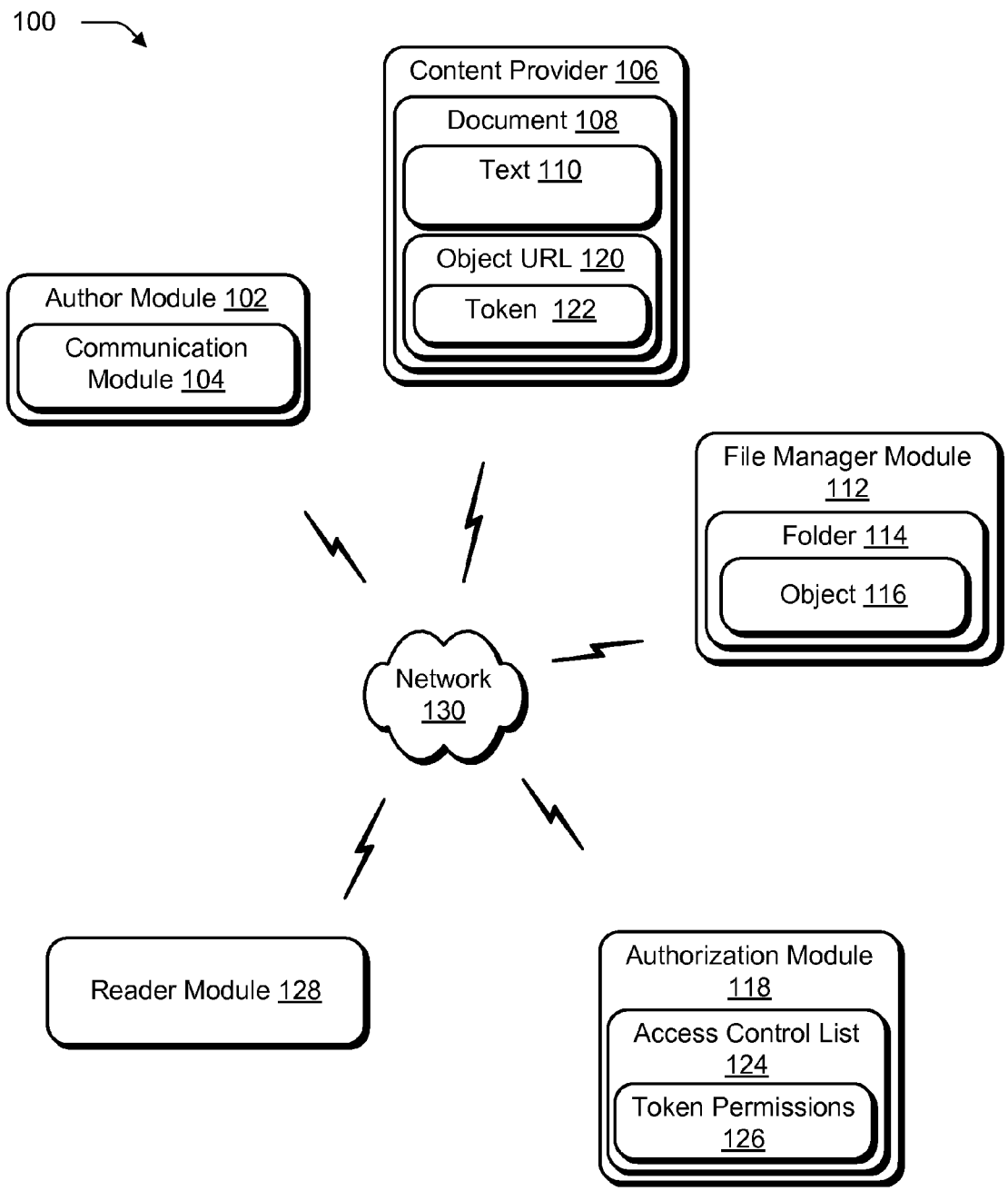
FIG. 1 is an illustration of an environment in an example implementation that is operable to employ revocable object access techniques.

Traditional object management and control techniques are vulnerable to being compromised and provide a user with little control over an object once the object is published in an electronic environment, e.g., online. Examples of an object that may be published include an image file, a video, an audio clip, and so on. The techniques discussed herein enable a user to manage access to an object that is published. For example, a user may publish a photograph as part of a web log (blog), and control who is entitled to view the photograph. If the user subsequently decides that the user does not want the photograph to be viewed, the user may revoke access to the photograph.

In an example implementation, an author provides text and a picture to be published as part of a blog entry. The text is uploaded to the blog's host server, and the picture is saved in a folder that is access controlled by the author. Access to the folder and its contents may be controlled using an access control list (ACL). A uniform resource locator (URL) is generated for the picture, and the URL includes a token that is registered in the ACL. Generally stated, a URL may provide an address for documents and other resources that reside on a network, such as the Internet. The token may include security-related information to identify and/or authorize a user as part of a request for data, such as a request for a document or an object. A token may include a string of characters (e.g., letters, numbers, and/or symbols) that may be used to authorize access to an object. Also, an ACL may comprise a list of permissions for one or more objects. An ACL may identify users, objects, and/or permission settings for the users and/or objects. For example, an ACL may specify that a user with a particular identifier may access and modify a particular file.

Continuing the example implementation, the URL is embedded into the blog entry (e.g., into the text), which causes the picture to be linked to the blog entry. Thus, when a reader navigates to the blog entry (e.g., by navigating to the blog's web address), the URL is used to request the picture.

Before the picture may be accessed and included with the blog entry, the ACL is checked to determine if permission settings for the token included in the URL indicate that the token has permission to access the picture. If the permission settings indicate that the token does have permission to access the picture, the picture is retrieved from the folder and included in the blog entry. The reader may then view the text and the picture as part of the blog entry. On the other hand, if the permission settings indicate that the token is not granted permission to access the picture, or if the token is not included in the ACL, the picture may not be provided with the blog entry. As used herein, the term "author" refers generally to a user or other entity that may create and/or cause to be created a document that includes an object. The term "reader" refers generally to a user or other entity that requests to view the document and/or the object. These terms are not to be read as limiting the claimed subject matter, and are used for purposes of example only.

In the following discussion, an example environment is first described that is operable to employ revocable object access techniques. Example procedures are then described which may be employed by the example environment, as well as in other environments.

Example Environment

FIG. 1 is an illustration of an environment 100 in an example implementation that is operable to employ revocable object access techniques. The illustrated environment 100 includes an author module 102 that is representative of functionality for creating and/or assembling content, such as text and objects. The content may be included in a document, such as a blog post, a web page, a social networking profile, and so on. The functionality represented by the author module 102 may include word processing, image editing, video editing, audio editing, and so on. The author module 102 includes a communication module 104 that is representative of functionality for handling communication to and from the author module 102, such as uploading text, objects, and documents.

In an implementation, the author module 102 may upload text to a content provider 106 to be included in a document, illustrated as a document 108 with text 110. Examples of the content provider 106 include a website host, a blog host, and so on. The content provider 106 is representative of functionality for receiving content and for storing the content (e.g., the text 110) as part of the document 108. The content provider 106 may also host the document 108 and provide the document 108 in response to a request for the document 108. For example, the document 108 may include a web page, and the content provider 106 may provide the web page to a reader that requests the web page.

To include an object with the document 108 while maintaining control over access to the object, the author module 102 may upload the object (e.g., via the communication module 104) to a file manager module 112. As illustrated, the file manager module 112 may store the object within a folder 114 as an object 116. The file manager module 112 may be configured to store and/or manage a plurality of files and objects for one or more users.

The environment 100 also includes an authorization module 118 that is representative of functionality for determining if access to an object (e.g., the object 116) is authorized in response to a request for the object. In an implementation, the authorization module 118 may generate a URL that specifies the location of the object 116, e.g., that the object 116 is located in the folder 114. The URL may be provided to the content provider 106 and embedded in the document 108, illustrated here as object URL 120. The object URL 120 includes a token 122. The token 122 is registered in an access control list (ACL) 124 that is part of the authorization module 118. The ACL 124 includes token permissions 126, which is representative of functionality for registering and tracking token permission settings for one or more tokens. For example, the token permissions 126 may include token permission settings for the token 122 that indicate whether or not the token 122 may be used to access the object 116.

A reader module 128 is also included as part of the environment 100, and is representative of functionality for requesting and consuming content, such as the document 108. The functionality represented by the reader module 128 may include a web browser, a media player, and/or other functionality that may be implemented on a computing device to access and consume content.

In an example implementation, the reader module 128 requests the document 108, e.g., via a web browser. In response to the request for the document 108, the content provider 106 submits the object URL 120 (which includes the token 122) to the file manager module 112 with a request for the object 116. The file manager module 112 then processes the request and detects the token 122. To determine if the object 116 may be provided to the content provider 106, the file manager module 112 queries the authorization module 118 with the token 122. The authorization module 118 may then check the access control list 124 to determine if the token permissions 126 indicate whether access to the object 116 is to be permitted based on the token 122. If the token permissions 126 indicate that access is to be granted to the object 116 based on the token 122, the object 116 is accessible by the content provider 106. The content provider 106 may then provide the document 108, including the text 110 and the object 116, to the reader module 128 that views the document 108. Alternatively, if the token permissions 126 indicate that access to the object 116 is not to be granted based on the token 122, the object may not be accessed by the content provider 106.

The different entities illustrated in the environment 100 are illustrated as being communicatively coupled, one to another, over a network 130. The network 130 may assume a wide variety of configurations. For example, the network 130 may include the Internet, a wide area network (WAN), a local area network (LAN), a wireless network, a public telephone network, an intranet, and so on. Further, although a single network 130 is shown, the network 130 may be configured to include multiple networks.

Additionally, although the different modules are illustrated as separate entities, two or more of the modules may reside together at a single location, such as on a computing device. Also, one or more of the modules may be configured for access via platform-independent protocols and standards to exchange data over the network 130. A module, for instance, may be provided via an Internet-hosted module (e.g., a web service) that is accessed via standardized network protocols, such as a simple object access protocol (SOAP) over hypertext transfer protocol (HTTP), and so on.

While environment 100 is discussed with reference to the single content provider 106, it is contemplated that access to objects may be controlled in scenarios involving a plurality of content providers. For example, a user may upload a plurality of objects to the folder 114, and each of the objects may have a unique URL and a unique token registered in the ACL 124. The user may generate multiple instances of content for multiple content providers, and associate one or more of the objects with each of the instances of content. Thus, in an example implementation, the techniques discussed herein enable a user to manage, at a single storage location, access to multiple objects associated with a plurality of instances of documents, content, and content providers. This is not limiting, however as other example implementations may utilize multiple storage locations without departing from the spirit and scope thereof. Also, multiple objects may be embedded in one or more documents utilizing the techniques discussed herein and each of the objects may have different permission settings within the ACL 124.

Generally, any of the functions described herein may be implemented using software, firmware, hardware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code may be stored in one or more computer readable memory devices. The features of revocable object access techniques described below are platform-independent, meaning that the techniques may be implemented on a variety of commercial computing platforms having a variety of processors.

Example Procedures

The following discussion describes revocable object access techniques that may be implemented utilizing the previously described environments and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference may be made to the environment 100 of FIG. 1.

Figure 2:
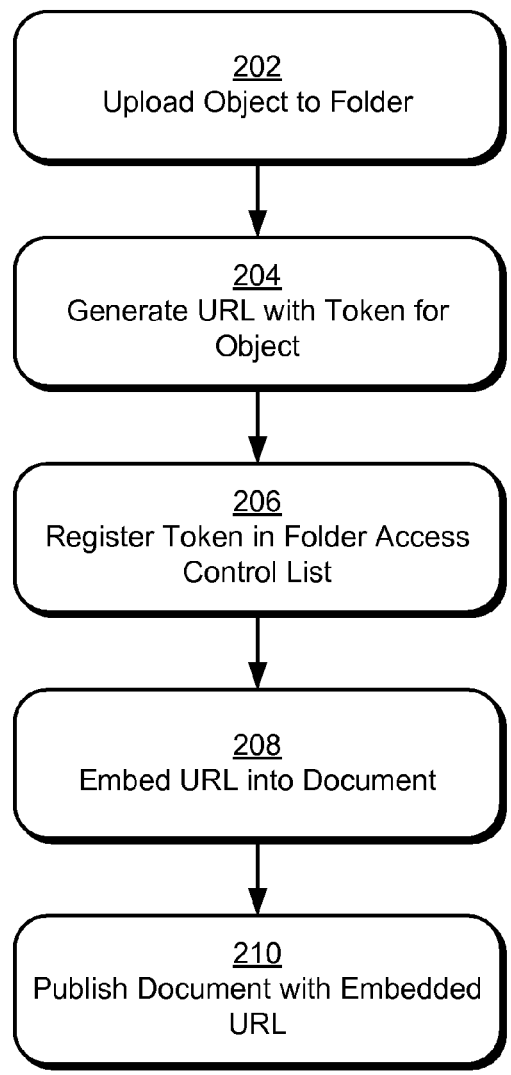
FIG. 2 is a flow diagram depicting a procedure in an example implementation in which access to an object is controlled via a URL embedded in a document.

FIG. 2 depicts a procedure 200 in an example implementation in which access to an object is controlled via a URL embedded in a document. An object is uploaded to a folder (block 202). For example, the object 116 may be uploaded to folder 114 utilizing one or more of a variety of techniques. For instance, the object 116 may be uploaded using an application-programming interface (API) hosted by a website (e.g., a blog site), an application executed on an author's computing device, a public API, and so on. In an example implementation, access to the contents of the folder 114 (e.g., object 116) is managed via an ACL 124. When the object 116 is initially uploaded to the folder 114, access to the object 116 may be restricted via an entry in the ACL 124 to the author that uploads the object 116. For example, a user identifier (UID) for the author may be included in the ACL 124, along with an indication that the UID is permitted access to the contents of the folder 114.

A URL is generated for the object, and the URL includes a token (block 204). An example of the object URL 120 may be "http://filemanager.com/folder/object116/wjb987uf". The object URL 120 indicates the location of the object 116, and includes the example token 122 "wjb987uf". The object URL 120 may be used to access the object 116, but may not be used to access other objects that may be stored in the folder 114. Thus, using the object URL 120 to access the object 116 does not, by itself, enable a reader or other entity to access other objects that may be stored in the folder 114.

The token is registered in an ACL for the folder (block 206). In an example implementation, an entry that includes the token 122 is created in ACL 124. Using the example object URL 120 presented above, the token 122 "wjb987uf" may be registered in the ACL 124. Permission settings for the token 122 may be set in the token permissions 126, such as whether or not the token 122 is permitted to access the object 116.

The URL is embedded in a document (block 208). For Example, the URL is included in the programming code of the document, such as by creating a document using a markup language (e.g., XML) and embedding the URL therein. The document with the embedded URL is published (block 210). Publishing the document may include making the document accessible to one or more readers, such as a reader that navigates to a blog site to view a blog post.

Figure 3:
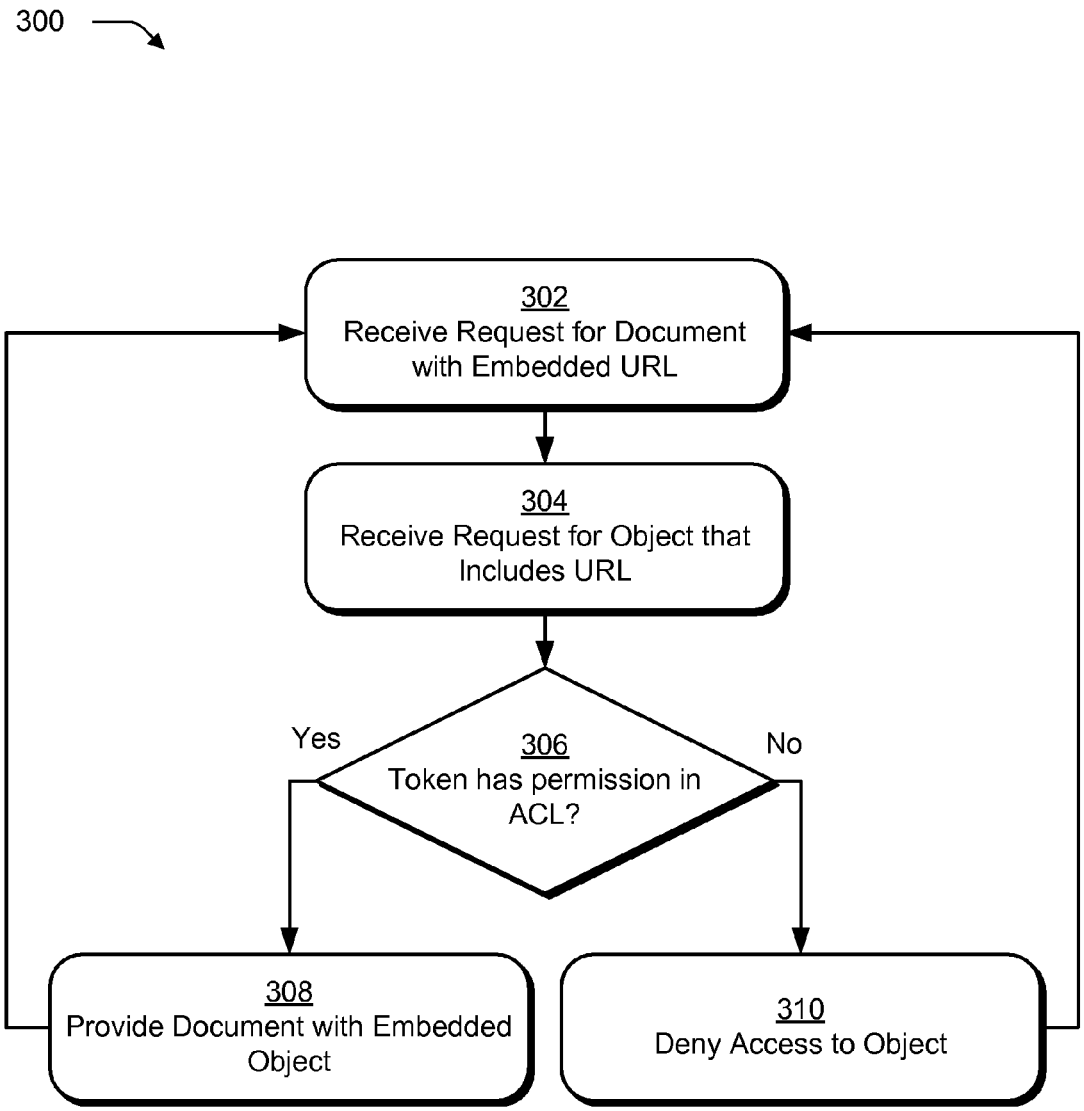
FIG. 3 is a flow diagram depicting a procedure in an example implementation in which a URL with a token is used to request an object associated with the document.

FIG. 3 depicts a procedure 300 in an example implementation in which a URL including a token is used to request an object. One or more of the acts discussed in procedure 300 may occur after a document has been published, as discussed above in FIG. 2. A request for a document is received, and the document includes an embedded URL with a token (block 302). For example, a reader that wants to view a blog entry may navigate using a web browser to a blog site that includes the blog entry. The web browser may request the blog entry from a host of the blog site. The text of the blog entry includes an embedded URL that references an object, such as a picture.

With reference to environment 100, a reader may utilize the reader module 128 to request document 108 from the content provider 106. The document 108 includes the object URL 120 and the token 122 embedded in the document 108.

A request for an object referenced by the URL is received, and the request includes the URL (block 304). For instance, the content provider 106 may submit a request for the object 116 with the object URL 120 to the file manager module 112. The file manager module 112 may process the request and detect the token 122 included in the object URL 120. The file manager module 112 forwards the token 122 to the authorization module 118, which checks the token permission settings in the token permissions 126 of the ACL 124 to check whether the token 122 may be used to access the object 116. In an example implementation, the request for the object 116 may be generated and submitted automatically and in response to the request for the document 108.

It is determined if the token has permission in the ACL to access the object (decision block 306). When the token has permission to access to the object ("Yes" from decision block 306), the document is provided with the object embedded in the document (block 308). For example, the content provider 106 may access the object 116 and embed the object 116 within the document 108. The document 108 with the embedded object 116 may be made available to the reader module 128.

Alternatively, if the token does not have permission to access the object ("No" from decision block 306), access to the object is denied (block 310). For example, the ACL 124 may indicate that the token 122 is denied access to the object 116, and/or the ACL 124 may not have an entry that includes the token 122. Thus, the content provider 106 may not be allowed access to the object 116. The content provider 106 may then provide the reader module 128 with document 108 that does not include the object 116. Alternatively and/or additionally, the content provider 106 may provide an error message to the reader module 128 that indicates that the document 108 and/or the object 116 is not available.

As illustrated in FIG. 3, when the token has permission to access to object, the document may continue to be provided with the embedded object in response to a request for the document. A change in the token permission settings, however, may result in a determination that the token does not have permission to access the object (block 306). When the token does not have permission to access the object, access to the object may be denied when the object is requested (block 310).

For example, with respect to the procedure 300, an author may initially configure the token permission settings in the token permissions 126 to indicate that the token 122 may be used to access the object 116. Thus, a request to access the object 116 may be allowed (block 308). Subsequently, however, the author may decide that the author does not want the object 116 to be accessed via the token 122, and the author may reconfigure the token permission settings to indicate that the token 122 does not have permission to access the object 116. A request to access the object 116 that includes the token 122 may then be denied (block 310). In an example implementation, token permission settings may be changed multiple times, thus allowing access to an object to be allowed, revoked, re-allowed, and so on. Thus, by managing object access via token permission settings in the ACL, associating a token with an object enables conditional access to the object. For example, to allow access to an object using a URL/token combination, a condition may require that the token permission settings for the token allow the object to be accessed.

Figure 4:
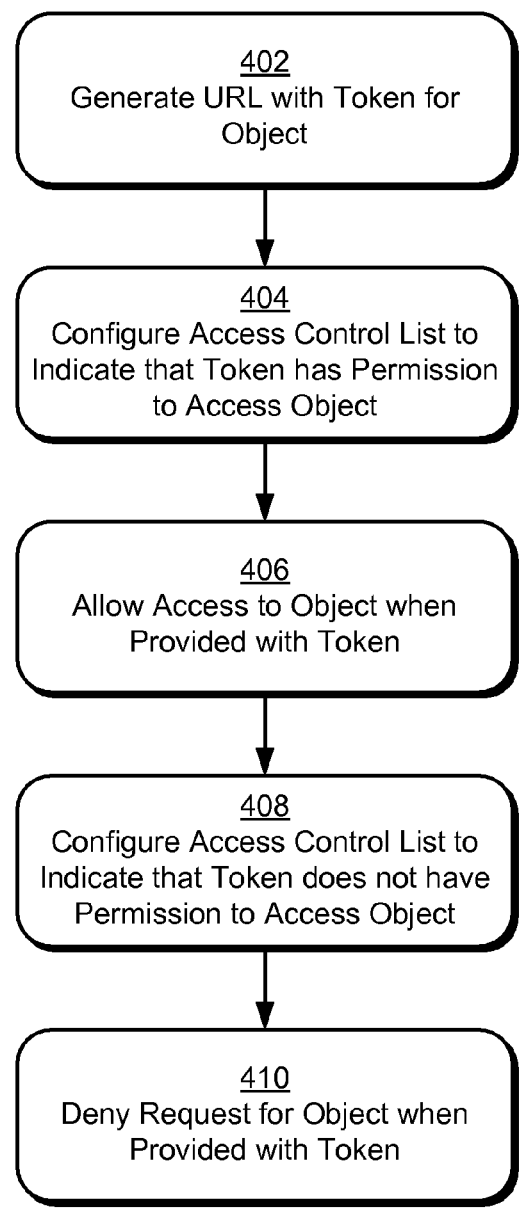
FIG. 4 is a flow diagram depicting a procedure in an example implementation in which an access control list is used to manage access to an object.

FIG. 4 depicts a procedure 400 in an example implementation in which an ACL is used to manage access to an object. A URL with a token is generated for an object (block 402). An ACL is configured to indicate that the token is usable to access the object (block 404). As discussed above, the ACL may include an entry for the token that indicates that the token is granted access to the object. For example, the token permissions 126 may be configured to indicate that the token 122 has permission to access the object 116. Access to the object is allowed when the token is provided (block 406). In an example implementation, a request for the object 116 may include the object URL 120, and the object URL 120 is processed to detect the token 122.

The ACL is configured to indicate that the token does not have permission to access the object (block 408). For example, access to the object 116 may be revoked for the token 122 by configuring an entry for the token 122 in the token permissions 126 to indicate that the token 122 is not to be used to grant access the object 116. Alternatively, the token 122 may be removed from the ACL 124 to revoke an ability to use the token 122 to access the object 116. A request for the object is denied when the token is provided (block 410). In an example implementation, a request for the object 116 that includes the object URL 120 and the token 122 may be denied.

Figure 5:
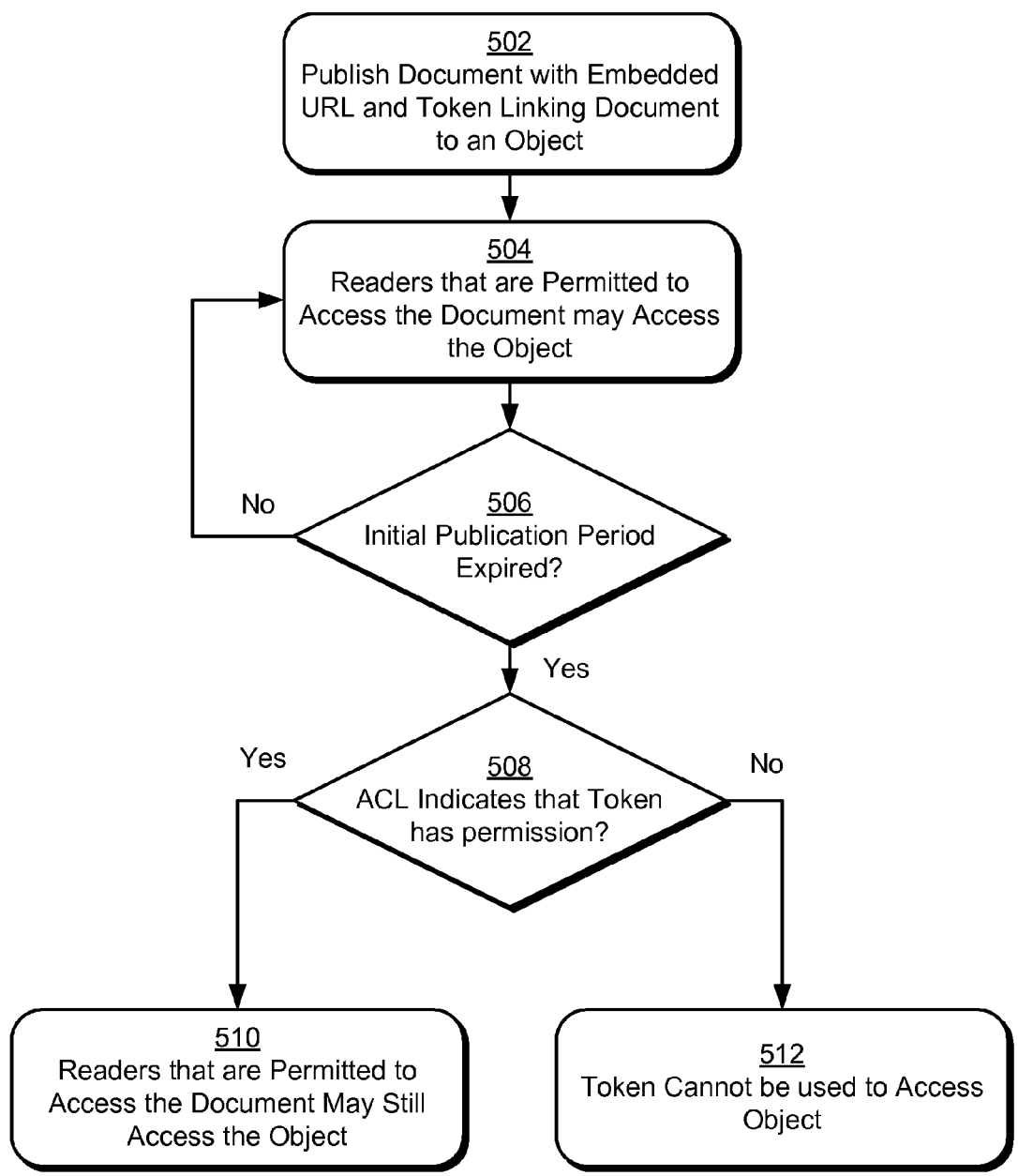
FIG. 5 is a flow diagram depicting a procedure in an example implementation in which an initial publication time period is considered in managing access to an object.

FIG. 5 depicts a procedure 500 in an example implementation in which an initial publication time period is considered in managing access to an object. A document is published that includes an embedded URL with a token, the URL and the token linking the document with an object (block 502). For example, the document may be a web page that is published, and the author of the web page may include an object with the page, such as a video clip. Readers that are permitted to access the document may access the object (block 504). In the current example, the web page may be restricted to particular readers via a suitable authentication technique. Thus, to view the web page, a reader may be required to authenticate the reader's identity, such as by a login procedure or other identification technique. If the reader is authenticated as a reader that is allowed to view the web page, the reader may access the web page and the object (e.g., the video clip) that is associated with the page. Alternatively, the web page may be accessible to any reader that navigates to the website that hosts the page.

It is determined if an initial publication period has expired (block 506). In an example implementation, an initial time period may be specified for a document. During the initial time period, a reader that is permitted to access the document may access the object without the token permission settings in an ACL being checked. For example, for 24 hours after the document 108 has been published, the object 116 may automatically be retrieved with the document 108 for a reader that is permitted to access the document 108. After the 24 hour period, the token permissions 126 may be checked to determine the token permission settings (e.g., whether the token 122 is granted access or denied access) before permitting access to the object 116.

If the initial publication period has not expired ("No" from decision block 506), then readers that are permitted to access the document may access the object (block 504). On the other hand, if the initial publication period has expired ("Yes" from decision block 506), then it is determined if the ACL indicates that the token has permission to access the object (block 508). If the ACL indicates that the token has permission to access the object ("Yes" from decision block 508), then readers that are permitted to access the document may still access the object (block 510). Alternatively, if the ACL indicates that the token does not have permission to access the object ("No" from decision block 508), then the token may not be used to access the object (block 512).

Generally, the blocks may be representative of modules that are configured to provide represented functionality. Further, any of the functions described herein may be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code may be stored in one or more computer readable memory devices. The features of the techniques described above are platform-independent, meaning that the techniques may be implemented on a variety of commercial computing platforms having a variety of processors.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A computing device comprising:
one or more processors; and
one or more computer-readable memory devices storing logic that, responsive to execution by the one or more processors, performs operations including:
receiving a request for a document in which a uniform resource locator (URL) that includes a token is embedded;
generating, in response to the request for the document in which the URL is embedded and independent of user input, a request to ascertain whether access to an object that is referenced by the URL is allowed, the request to ascertain whether access to the object is allowed including the URL and the token included in the URL, and the request to ascertain whether access to the object is allowed being separate from the request for the document;
providing the document responsive to receiving the request for the document; and
allowing access to the object with the provided document based on whether one or more token permission settings in an access control list indicate that the token is usable to grant permission to access the object.

2. A computing device as recited in claim 1, wherein the object comprises one or more of a picture, a video file, or an audio file.

3. A computing device as recited in claim 1, the operations further comprising allowing access to the document and denying access to the object in response to a determination that the token is expired.

4. A computing device as recited in claim 1, wherein the access control list is configured to manage tokens for multiple objects.

5. A computing device as recited in claim 1, wherein the access control list is configured to enable revocation of permission to allow access to the object.

6. A computing device as recited in claim 1, the operations further comprising denying access to the object based on whether one or more of the token permission settings in the access control list indicate that the token is not usable to allow access to the object.

7. A computing device as recited in claim 1, the operations further comprising:
receiving another request for the document in which the URL that includes the token is embedded;
generating, in response to the other request for the document in which the URL is embedded, another request to ascertain whether access is allowed to the object; and
denying the other request to access the object based on a change in the token permission settings in the access control list.

8. A method comprising:
embedding a uniform resource locator (URL) that references an object into a document, the URL including a token and the object being separate from the document;
receiving a request for the document;
generating, in response to the request for the document in which the URL is embedded and independent of user input, a request to ascertain whether access to the object that is referenced by the URL is allowed, the request to ascertain whether access to the object is allowed including the URL and the token included in the URL, and the request to ascertain whether access to the object is allowed being separate from the request for the document; and
allowing the object referenced by the URL and separate from the URL to be automatically retrieved in response to the request for the document and along with the document based on whether an access control list indicates that the token is usable to grant permission to access the object.

9. A method as recited in claim 8, wherein the object comprises one or more of an image file, a video file, or an audio file.

10. A method as recited in claim 8, wherein the document is published to be accessed online.

11. A method as recited in claim 8, wherein the object is stored in a folder that stores a plurality of objects, and wherein access to each of the plurality of objects is controlled with a different token.

12. A method as recited in claim 11, wherein the access control list comprises permission settings for multiple of the plurality of objects.

13. A method as recited in claim 11, wherein one or more of the plurality of objects is embedded in a different document using a different URL.

14. A method as recited in claim 8, further comprising denying access to the object based on whether the access control list indicates that the token is not granted permission to access the object.

15. A method as recited in claim 8, further comprising:
receiving an additional request for the document, the additional request including the URL; and
denying access to the object based on a change in one or more token permission settings in the access control list.

16. One or more computer readable memories storing instructions that are executable by one or more processors to cause the one or more processors to perform operations comprising:
generating a uniform resource locator (URL) for an object, the URL being separate from the object and including a token that is usable to control access to the object;
embedding the URL into a document;
receiving a request for the document;
generating, in response to the request for the document in which the URL is embedded and independent of user input, a request to ascertain whether access to the object that is referenced by the URL is allowed, the request to ascertain whether access to the object is allowed including the URL and the token included in the URL, and the request to ascertain whether access to the object is allowed being separate from the request for the document; and
determining whether access to the object is permitted based on one or more token permission settings for the token in an access control list.

17. One or more computer readable memories as recited in claim 16, wherein the operations further comprise:
receiving an additional request for access to the object; and
determining, responsive to the additional request for access to the object, whether the one or more token permission settings indicate that the object may be provided with the document.

18. One or more computer readable memories as recited in claim 16, wherein the operations further comprise:
providing the document responsive to receiving the request for the document; and
denying, based on the one or more token permission settings, access to the object.

19. One or more computer readable memories as recited in claim 16, wherein the request to ascertain whether access to the object that is referenced by the URL is allowed for the object is a first request for access to the object and wherein the operations further comprise:
allowing access to the object based on a determination that the one or more token permission settings indicate that the token included in the URL has permission to access the object;
receiving a second request for access to the object, the second request including the URL; and
denying the second request for access to the object based on a determination that the one or more token permission settings have changed to indicate that the token included in the URL does not have permission to access the object.

20. One or more computer readable memories as recited in claim 16, wherein the operations further comprise:
when the request for access to the object that includes the URL occurs within a specified period of time after the object is published, allowing the request without checking the one or more token permission settings in the access control list; and
when the request for access to the object that includes the URL occurs after the specified period of time after the object is published, checking the one or more token permission settings to determine whether the token included in the URL is usable to access to the object.

* * * * *